United States Patent
Hagiwara et al.

(10) Patent No.: US 11,454,729 B2
(45) Date of Patent: Sep. 27, 2022

(54) DRIVING EVALUATION APPARATUS

(71) Applicant: Honda Motor Co., Ltd., Tokyo (JP)

(72) Inventors: Yuki Hagiwara, Tokyo (JP); Takahiro Oyama, Tokyo (JP); Mitsuhiro Baba, Wako (JP); Akihiro Hirashima, Tokyo (JP); Tomoyuki Nitta, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 17/266,711

(22) PCT Filed: Aug. 1, 2019

(86) PCT No.: PCT/JP2019/030161
§ 371 (c)(1),
(2) Date: Feb. 8, 2021

(87) PCT Pub. No.: WO2020/031828
PCT Pub. Date: Feb. 13, 2020

(65) Prior Publication Data
US 2021/0311209 A1   Oct. 7, 2021

(30) Foreign Application Priority Data

Aug. 9, 2018 (JP) .............................. JP2018-150333

(51) Int. Cl.
*G01S 19/52* (2010.01)
*G01S 19/53* (2010.01)
*G08G 1/13* (2006.01)

(52) U.S. Cl.
CPC .............. *G01S 19/53* (2013.01); *G01S 19/52* (2013.01); *G08G 1/13* (2013.01)

(58) Field of Classification Search
CPC .. G08G 1/00; G08G 1/13; G01S 19/14; G01S 19/52; G01S 19/53
See application file for complete search history.

(56) References Cited

U.S. PATENT DOCUMENTS

| 2004/0054513 A1* | 3/2004 | Laird ..................... G07B 15/06 |
| | | 703/8 |
| 2013/0169433 A1* | 7/2013 | Eitan ..................... G08G 1/207 |
| | | 340/539.13 |

(Continued)

FOREIGN PATENT DOCUMENTS

| JP | 2004280594 A | 10/2004 |
| JP | 2007284049 A | 11/2007 |

(Continued)

OTHER PUBLICATIONS

International Preliminary Report on Patentability; Application PCT/JP2019-030161; dated Aug. 9, 2018.

(Continued)

*Primary Examiner* — Erin F Heard
*Assistant Examiner* — Hailey R Le
(74) *Attorney, Agent, or Firm* — Duft & Bornsen, PC

(57) ABSTRACT

Driving-evaluation-apparatus evaluating driving-status of driver driving mobile-body, includes: microprocessor and memory. The microprocessor functions as: information-acquisition-unit acquiring location/travel-speed-information of mobile-body based on GPS-signals received by driver's mobile-terminal; entry-direction-calculation-unit calculating entry-direction in which mobile-body enters determination-area based on location/travel-speed-information; entry-direction-determination-unit determining whether angle formed by entry-direction and predetermined-reference-entry-direction is predetermined-angle or smaller; state-determination-unit determining whether there is stop/deceleration-state in which travel-speed is predetermined-travel-speed or lower within time-period from time-point when mobile-body enters determination-area to time-point when mobile-body exits determination-area based on location/travel-speed-information when angle is predetermined-angle or smaller; and driving-evaluation-unit evaluating driver's driving-status in determination-area based on determination-result. The determination-area is area inside determination-circle centered on reference-point predetermined-distance before the predetermined-location and having predetermined-radius. The angle is angle formed by: straight-line along the reference-entry-direction and passing (Continued)

through the reference-point; and straight-line connecting plot representing location of the mobile-body before entering inside the determination-circle based on location/travel-speed-information and the reference-point.

5 Claims, 8 Drawing Sheets

(56) References Cited

U.S. PATENT DOCUMENTS

| | | | | |
|---|---|---|---|---|
| 2014/0162219 A1* | 6/2014 | Stankoulov | .......... | G09B 19/167 |
| | | | | 434/65 |
| 2016/0066146 A1* | 3/2016 | Jernigan | ............... | H04W 4/029 |
| | | | | 455/456.1 |
| 2021/0042531 A1* | 2/2021 | Zhang | .................. | G06V 20/582 |
| 2022/0011128 A1* | 1/2022 | Lee | .................... | G01C 21/3407 |

FOREIGN PATENT DOCUMENTS

| | | | |
|---|---|---|---|
| JP | 2009264853 A | 11/2009 | |
| JP | 2011118723 A | 6/2011 | |

OTHER PUBLICATIONS

International Search Report; Application PCT/JP2019/030161; dated Oct. 21, 2019.

* cited by examiner

DRIVING EVALUATION APPARATUS

CROSS-REFERENCE TO RELATED APPLICATION

This application is a National Stage of PCT international application Ser. No. PCT/JP2019/030161 filed on Aug. 1, 2019 which designates the United States, incorporated herein by reference, and which is based upon and claims the benefit of priority from Japanese Patent Application No. 2018-150333, filed on Aug. 9, 2018, the entire contents of which are incorporated herein by reference.

TECHNICAL FIELD

This invention relates to a driving evaluation apparatus for evaluating driving status of drivers.

BACKGROUND ART

As a technique of this type, there has been conventionally known a device which receives GPS signals by GPS receiver mounted on vehicle, determines whether the vehicle is in the stop state based on the GPS signals (for example, Patent Document 1). The apparatus described in Patent Document 1 calculates the angle indicating the moving direction and the moving speed of the vehicle based on the GPS signals, and determines that the vehicle is in a stop state when the change amount of the angle is equal to or more than a predetermined value and the moving speed is equal to or lower than a predetermined value.

CITATION LIST

Patent Literature

Patent Document 1: Japanese Unexamined Patent Publication No. 2009-264853

DISCLOSURE OF INVENTION

Problems to be Solved by the Invention

However, since the device described in Patent Document 1 calculates the amount of change in angle, the calculation load becomes high, it is difficult to appropriately evaluate the driving status of the vehicle in an area where the stop or deceleration is required.

Means for Solving Problem

An aspect of the present invention is a driving evaluation apparatus configured to evaluate a driving status of a driver driving a mobile body in an area with stop obligation or deceleration obligation. The driving evaluation apparatus includes: an information acquisition unit configured to acquire location information and travel speed information of the mobile body based on GPS signals received by a GPS receiver provided on a mobile terminal carried by the driver or provided on the mobile body; an entry direction calculation unit configured to calculate an entry direction in which the mobile body enters a determination area including a predetermined location requiring stop or deceleration of the mobile body based on the location information of the mobile body acquired by the information acquisition unit; an entry direction determination unit configured to determine whether an angle formed by the entry direction calculated by the entry direction calculation unit and a predetermined reference entry direction of the mobile body on a route in the determination area is equal to or smaller than a predetermined angle; a state determination unit configured to determine whether there is a stop state or a deceleration state in which a travel speed of the mobile body is equal to or lower than a predetermined travel speed within a time period from a time point when the mobile body enters the determination area to a time point when the mobile body exits the determination area based on the location information and the speed information of the mobile body acquired by the information acquisition unit, when it is determined by the entry direction determination unit that the angle formed by the entry direction and the reference entry direction is equal to or smaller than the predetermined angle; and a driving evaluation unit configured to evaluate the driving status of the driver in the determination area based on a determination result of the state determination unit. The determination area is an area inside a determination circle centered on a reference point a predetermined distance before the predetermined location and having a predetermined radius. The angle formed by the entry direction and the reference entry direction is an angle formed by: a straight line along the reference entry direction and passing through the reference point; and a straight line connecting a plot representing location of the mobile body before entering inside the determination circle based on information acquired by the information acquisition unit and the reference point.

Effect of the Invention

According to the present invention, it becomes possible to appropriately evaluate the driving status of the driver in an area where stop or deceleration is required.

DESCRIPTION OF EMBODIMENT

An embodiment of the present invention is explained with reference to FIG. 1 to FIG. 9 in the following. A driving evaluation apparatus according to the embodiment of the present invention can be applied to management systems that evaluate driving status of workers in charge of driving vehicles in working hours, in various industries. Hereafter, an example will be described in which the present driving evaluation apparatus is applied to a management system of a distribution business or post office that picks up and delivers cargoes by drivers driving vehicles.

[Functional Configuration of Management System 100]

Figure 1:
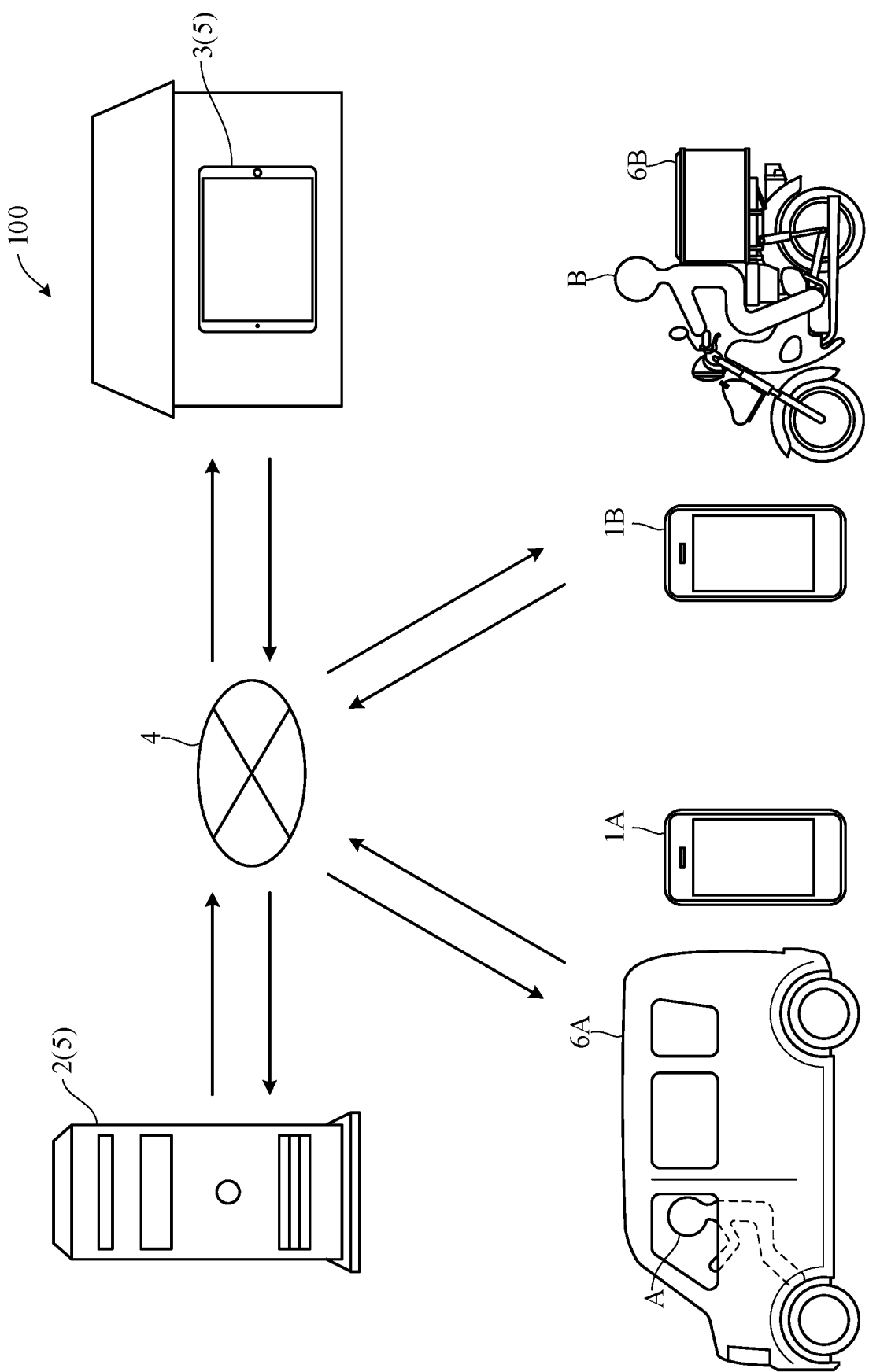
FIG. 1 is a diagram showing an example of configuration of a management system including a driving evaluation apparatus according to an embodiment of the present invention.

First, the function configuration of a management system 100 according to the embodiment of the present invention will be described. FIG. 1 is a diagram showing an example of the configuration of the management system 100. As shown in FIG. 1, the management system 100 includes multiple (two in FIG. 1) driver terminals 1A and 1B, a management server 2, and a manager terminal 3 that are connected through a network 4 which includes a public wireless communication network typified by the Internet network, mobile phone network, or the like. In the management system 100 thus configured, the management server 2 and manager terminal 3 form a driving evaluation apparatus 5 according to the embodiment of the present invention. The management server 2 or manager terminal 3 alone may form the driving evaluation apparatus 5. The network 4 also includes closed communication networks provided for predetermined management areas, such as wireless LANs or Wi-Fi (Wireless Fidelity) (Registered Trademark).

The driver terminals 1A and 1B are held in clothes pockets, bags, pouches, or the like of the drivers A and B who conduct pickup and delivery are visiting the pickup destinations, or disposed in the cradles or the like of vehicles 6A and 6B used for pickup and delivery. In the present embodiment, smartphones or tablet terminals, mobile phones, PDAs (Personal Digital Assistants), and various types of wearable terminals that are connectable to a public wireless communication network are collectively referred to as the driver terminals 1A and 1B. The driver terminals 1A and 1B have the same configuration. The number of driver terminals may be three or more. The vehicles 6A and 6B are transportation vehicles, such as four-wheeled vehicles, motorcycles, bicycles, or carts. FIG. 1 shows a light truck (e.g., a light truck having a predetermined displacement or less) 6A, which is widely being used to pick up and deliver cargoes or mails, and a motorized bicycle (e.g., a motorcycle including a motor having a predetermined displacement or less) 6B as an example.

Next, the configuration of the driver terminals 1A and 1B, management server 2, and manager terminal 3 will be described.

<Driver Terminals 1A, 1B>

First, the driver terminals 1A and 1B will be described. Various types of application software can be installed on the driver terminals 1A and 1B. The driver terminals 1A and 1B according to the present embodiment form a part of the management system in accordance with application software installed in smartphones. By using commercially available smart-phones, the cost of constituting the system can be reduced.

Figure 2:
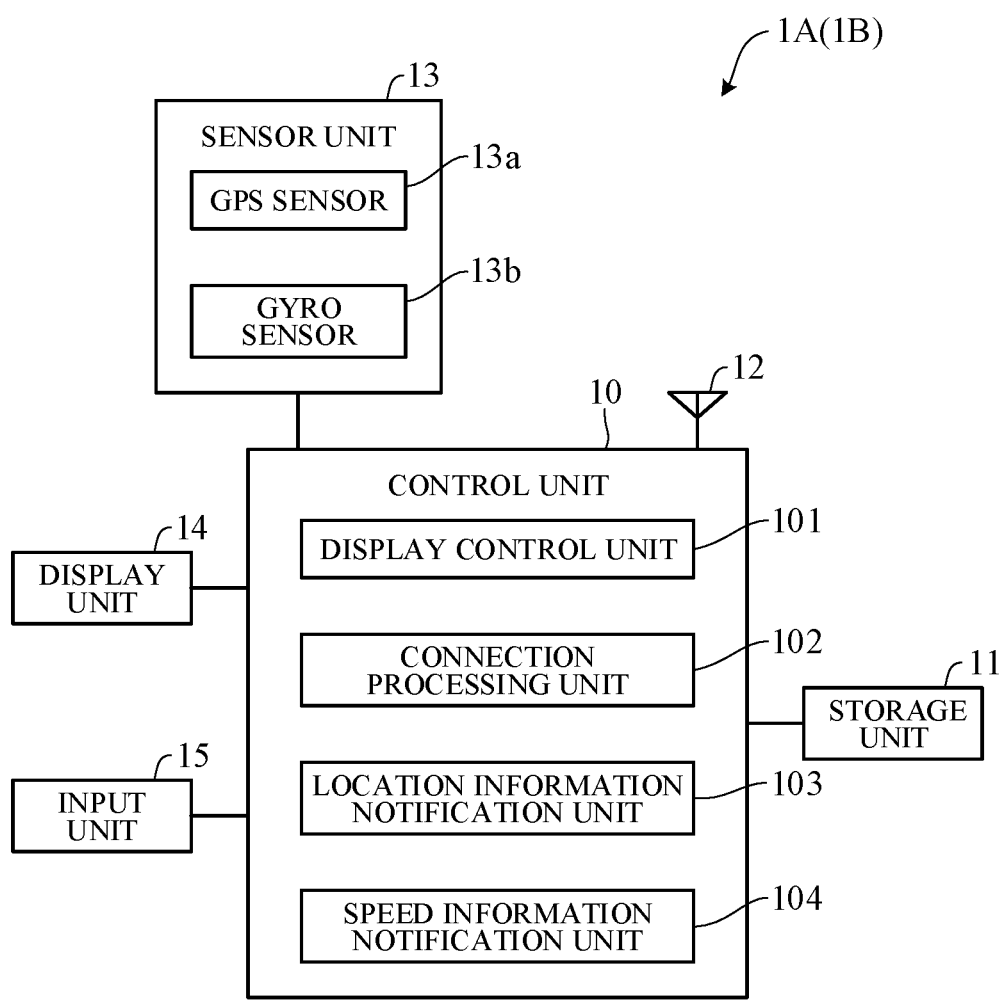
FIG. 2 is a block diagram showing a schematic configuration of a driver terminal in FIG. 1.

FIG. 2 is a block diagram showing a schematic configuration of the driver terminals 1A and 1B. As shown in FIG. 2, the driver terminal 1A includes a control unit 10, a storage unit 11, a wireless unit 12, a sensor unit 13, a display unit 14, and an input unit 15.

The storage unit 11 consists of a semiconductor memory, hard disk, or the like. The storage unit 11 stores various types of information, such as software including an operating system (OS) and application programs for supporting pickup and delivery work, map information, such as road maps and residential maps, and customer information about pickup destinations and delivery destinations. The customer information includes the addresses and phone numbers of the pickup destinations and delivery destinations, as well as customer-related information, such as whether the customers have delivery boxes. The software, map information, and customer information may be previously stored in the storage unit 11, or acquired from the management server 2. The storage unit 11 also stores information including the addresses, phone numbers, designated time slots, and the like of the pickup destinations and delivery destinations assigned to the drivers A and B corresponding to the driver terminals 1A and 1B.

The wireless unit 12 includes a digital signal processor (SP) and the like and is configured to be able to wirelessly communicate with the management server 2 through the wireless communication network typified by a mobile phone network, such as 3G, LTE, 4G, or 5G. The wireless unit 12 may include a near-field wireless communication unit (not shown) capable of using a near-field wireless communication technology, such as Wi-Fi (Registered Trademark) or Bluetooth (Registered Trademark). The wireless unit 12 is able to transmit a login ID for identifying the driver A or B (driver ID), information indicating the current location of the driver A or B or vehicle 6A or 6B, travel speed information, and the like to the management server 2.

The sensor unit 13 includes a GPS sensor 13*a* that receives locating signals from multiple GPS satellites and measures the absolute location (latitude, longitude) of the driver A or B corresponding to the driver terminal 1A or 1B and a gyro sensor 13*b* that detects the angular velocity, and the like. The current location may be calculated on the basis of information about the base stations of the wireless communication network acquired from the wireless unit 12. The travel speed of the driver A, B or the vehicle 6A, 6B may be calculated on the basis of time-series changes in the location information acquired by the GPS sensor 13*a*, i.e., change amount of position coordinates per unit time. Acceleration can be calculated based on the time series change of the travel speed, that is, the change amount per unit time of the travel speed. If it is difficult to receive locating signals from the GPS satellites, the current location of the driver A or B or vehicle 6A or 6B may be calculated using Assisted Global Positioning System (AGPS) communication on the basis of the base station information acquired from the wireless unit 12.

The display unit 14 consists of a display device, such as a liquid crystal display or organic EL panel. The display unit 14 receives an instruction from the control unit 10 and displays a map, a button icon for operating a touchscreen, or the like. The display unit 14 also displays various types of information, such as the current location of the driver A or B or vehicle 6A or 6B, a map around the current location, and a map around the pickup destination and the delivery destination. The display unit 14 is also able to display the pickup and delivery order information stored in the storage unit 11.

The input unit 15 consists of a physical switch, such as a numeric keypad operated by the driver A or B, an input device (not shown), such as a touchscreen disposed so as to be overlaid on the display surface of the display unit 14, or the like. The input unit 15 outputs a signal based on operation input, such as depression of the numeric keypad or touchscreen by the driver A or B, to the control unit 10. Thus, for example, the screen display of the display unit 14 is changed.

Although not shown, the driver terminals 1A and 1B may further include a speaker, vibrator, light, microphone, and the like. The speaker, vibrator, or light notifies the driver of various types of information through a sound, vibration, or light. The speaker outputs a sound to the driver, and the microphone collects a sound or the like issued from the driver. Thus, various types of information is outputted from the speaker in the form of a sound, and various types of commands inputted in the form of a sound through the microphone by the driver are inputted to the control unit 10 using a sound recognition technology.

The control unit 10 includes a processor having a CPU, RAM, ROM, I/O or the like. The CPU performs prestored programs and transmits and receives signals to and from the storage unit 11, the wireless unit 12, the sensor unit 13, the display unit 14, and the input unit 15. The control unit 10 has a display control unit 101, a connection processing unit 102, a location information notification unit 103, and a speed information notification unit 104, as a functional configuration.

The display control unit 101 generates an image signal in response to an operation on the input unit 15 or in response to the wireless unit 12 receiving various information and transmits the image signal to the display unit 14. Thus, the screen display on the display unit 14 is controlled. The screens that the display control unit 101 causes the display unit 14 to display include a login screen for logging in to the management system 100 and the like.

The connection processing unit 102 transmits, to the management server 2 through the wireless unit 12, a login ID and a password inputted by the driver A or B on the login screen displayed on the display unit 14 through the input unit 15. Thus, the driver terminal 1A or 1B is communicatively connected to the management server 2. The driver performs this login input when starting to work, that is, when departing from the base station. When logout is inputted through the input unit 15, the connection processing unit 102 transmits the logout to the management server 2 through the wireless unit 12. Thus, the communication connection between the driver terminal 1A or 1B and management server 2 is complete. The driver performs this logout input when finishing work, that is, when returning to the base station. Logout may be automatically performed on the basis of the time or location information when the driver returns to the base station.

The location information notification unit 103 transmits current location information of the driver A or B or vehicle 6A or 6B moving with the driver terminal 1A or 1B calculated on the basis of the GPS signals received by the sensor unit 13 (GPS sensor 13a), current time information acquired from a clocking unit (not shown), and the like to the management server 2 through the wireless unit 12 at predetermined time intervals (e.g., at intervals of 3 s) such that these pieces of information are associated with the driver ID. The time information includes not only the time but also information, such as year, month, and date. The management server 2 may calculate the travel speed or moving direction of the driver or vehicle from time-series changes in the location information of the vehicle.

The positions of the drivers A and B or the vehicles 6A and 6B change from moment to moment. For this reason, when current location information is acquired at predetermined time intervals, the position obtained from the latest current location information and the actual position may not exactly match each other. However, the deviation is small and therefore the location obtained from current location information acquired at predetermined time intervals can be considered as the current location. Multiple pieces of information, such as current location information of the driver A or B or vehicle 6A or 6B acquired at predetermined time intervals and current time information may be collectively transmitted at once (so-called "burst transmission"). The time intervals at which current location information of the driver or vehicle is acquired (e.g., time intervals of 3 s), the number of pieces of information transmitted at once when burst-transmitting multiple pieces of information collectively, or the like may be previously set.

The speed information notification unit 104 calculates the travel speed and acceleration of the driver A or B or vehicle 6A or 6B moving with the driver terminal 1A or 1B on the basis of signals from the sensor unit 13 (GPS sensor 13a) and transmits the travel speed and acceleration along with current time information acquired from a clocking unit through the wireless unit 12 at predetermined time intervals (e.g., at intervals of 3 s) such that these pieces of information are associated with the driver ID. The management server 2 may calculate the travel speed and acceleration on the basis of location information transmitted from the location information notification unit 103. The management server 2 may calculate the travel speed based on the location information notified by the location information notification unit 103. In this case, the speed information notification unit 104 is unnecessary.

When a GPS signal from a GPS satellite is blocked by a large structure, mountain, or the like, the GPS sensor 13a may not be able to receive the GPS signal. Location information calculated on the basis of the GPS signal received by the GPS sensor 13a may include an error of several meters to several tens of meters due to an error in the orbit of the GPS satellite, a delay in the propagation of the GPS signal in the ionosphere or troposphere, reflection of the GPS signal by the large structure, mountain, or the like (multipath phenomenon), noise, and others. Similarly, information indicating the travel speed and acceleration calculated on the basis of the location information based on the GPS signal may include an error.

<Management Server 2>

Next, the management server 2 will be described. While, in the present embodiment, the management server 2 is described as a single server having various functions, it may be a distributed server consisting of servers having different functions or may be realized by a cloud server (virtual server).

Figure 3:
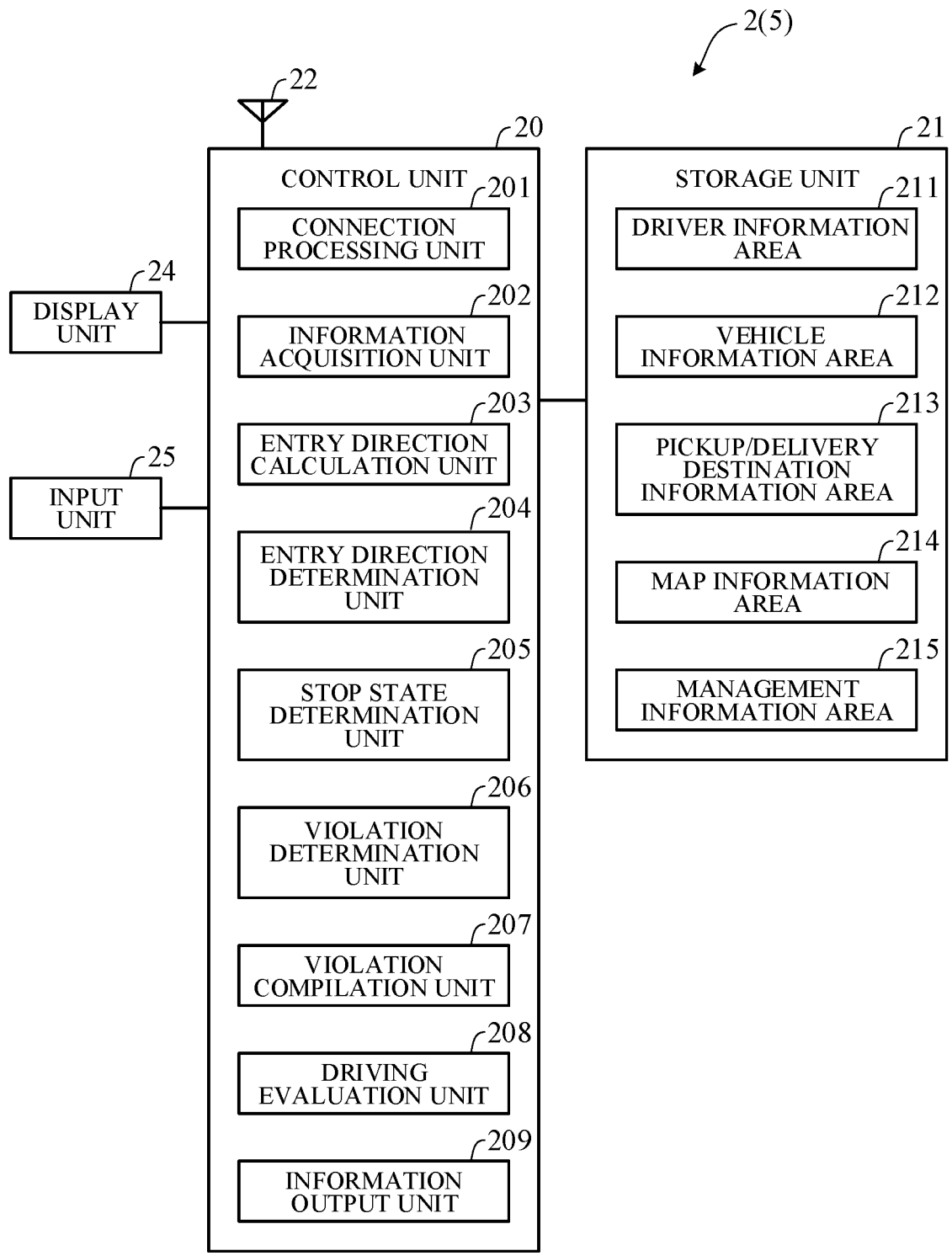
FIG. 3 is a block diagram showing a schematic configuration of a management server in FIG. 1.

FIG. 3 is a block diagram showing a schematic configuration of the management server 2. As shown in FIG. 3, the management server 2 includes a control unit 20, a storage unit 21, a communication unit 22, a display unit 24, and an input unit 25. The display unit 24 and input unit 25 may be omitted, or may consist of other information terminals (not shown) connected to the management server 2.

The storage unit 21 consists of a semiconductor memory, hard disk, or the like. The storage unit 21 stores various types of information, such as software including an operating system (OS) and application programs. Various storage areas, such as a driver information area 211, a vehicle information area 212, a pickup/delivery destination information area 213, a map information area 214, and a management information area 215 are ensured in the storage unit 21. An information area is, for example, a table in a database management system, or the like.

Driver information used to manage each driver, such as the name and the belonging base station ID of the driver, is stored in a driver information area 211 so as to be associated with the employee ID of the driver (also referred to as the driver ID), which is identification information of the driver. A vehicle ID, which is identification information of a vehicle used by each driver, such as vehicle 6A or 6B, is also stored in the driver information area 211 so as to be associated with the driver ID of the driver. For example, the manager of the base station previously sets the association of the vehicle ID with the driver ID before starting daily pickup management work.

Information about each vehicle, including the vehicle type, such as four-wheeled vehicle, motorcycle, or bicycle, and the size of the cargo room, is previously stored in the vehicle information area 212 so as to be associated with the ID of the vehicle.

Pickup destination and delivery destination information, including the addresses, phone numbers, pickup details, and designated time slots of the pickup destinations and the delivery destinations, and the drivers A and B assigned to the pickup destinations and the delivery destinations, is stored in the pickup/delivery destination information area 213.

Map information is previously stored in the map information area 214. The map information includes road link information, map data for displaying the background, such as roads and road maps, information about road types (general road, highway), and the like. The map information includes information on the legal speed of each road and the position of an intersection (stop sign area) where vehicles are required to be stopped. Such map information is updated periodically.

Management information previously set by the manager to evaluate the driving status of each driver, for example, information indicating the time-series locations of the drivers A and B or vehicles 6A and 6B and the speed and acceleration acquired from the driver terminals 1A and 1B, is stored in a management information area 215. The management information includes, for example, threshold value for determining stop sign violation, sudden braking, speed excess, and the like. The threshold value for determining stop sign violation includes location information of a stop determination area GF set in a range, for example, a circular range having a radius of about 40 m, before a stop line (geo-fence information) and information indicating the direction SD in which the vehicle enters the stop determination area GF (reference entry direction) when the vehicle should stop. The threshold value for determining sudden braking include the threshold value of acceleration (e.g., deceleration of 10 km/h/s or more). The threshold value for determining speed excess include a threshold value for determining whether the legal speed is exceeded, a threshold value for determining whether the regulation speed is exceeded, and location information of a speed management area in which it is determined whether the regulation speed is exceeded. While the determination of sudden braking involves simply determining whether a predetermined deceleration or more has occurred, inappropriate driving behaviors, such as stop sign violation, speed excess, or sudden braking, which are unpreferable in terms of safe driving are regarded as traffic violations in the following description.

While stop determination areas GF, speed management areas, and the threshold values for determining the legal speed or regulation speed are set considering location information of the stop sign area and road-specific legal speeds or regulation speeds included in map information stored in a map information area 214, the manager may set (change) them arbitrarily. For example, an intersection without stop obligation may be additionally registered as a stop determination area GF. Also, considering an error in location and speed measurement using GPS satellites, a location in which it is difficult to accurately determine whether stop sign violation or speed excess has occurred, due to the width or shape of the road may be excluded from the stop determination areas GF or speed management areas.

Also, information indicating the location and date and time of a traffic violation determined on the basis of the management information and information indicating the location of the vehicle 6A or 6B, speed, and acceleration, and violation information including the driver ID of the driver A or B that has committed the violation are stored in the management information area 215. The violation information is stored such that the location of each traffic violation is associated with a driver ID.

To communicate with the driver terminals 1A and 1B, the communication unit 22 implements a communication protocol capable of wireless communication, such as 3G, LTE, 4G, or 5G. On the other hand, to communicate with the manager terminal 3, the communication unit 22 implements a communication protocol capable of wired communication (e.g., Internet line or the like) or wireless communication.

The control unit 20 includes a processor having a CPU, RAM, ROM, I/O or the like. The control unit 20 has a connection processing unit 201, an information acquisition unit 202, an entry direction calculation unit 203, an entry direction determination unit 204, a stop state determination unit 205, a violation determination unit 206, a violation compilation unit 207, a driving evaluation unit 208, and an information output unit 209, as a functional configuration.

The connection processing unit 201 processes login from the driver terminal 1A or 1B and connects the driver terminal 1A or 1B to the management server 2, as well as processes logout from the driver terminal 1A or 1B and completes the connection between the driver terminal 1A or 1B and the management server 2. The connection processing unit 201 also processes login from the manager terminal 3 and connects the manager terminal 3 to the management server 2, as well as processes logout from the manager terminal 3 and completes the connection between the manager terminal 3 and management server 2.

The information acquisition unit 202 acquires various types of information by receiving data transmitted from the driver terminals 1A and 1B to the management server 2 and data transmitted from the manager terminal 3 to the management server 2, through the communication unit 22. The information acquired by the information acquisition unit 202 includes location information, travel speed information, and acceleration information of the vehicles 6A and 6B transmitted from the location information notification units 103 and the speed information notification unit 104 of the driver terminals 1A and 1B and time information corresponding to these information, management information and a driving evaluation information output request transmitted from the manager terminal 3, and the like. The location information is specifically represented by latitude and longitude.

Figure 4:
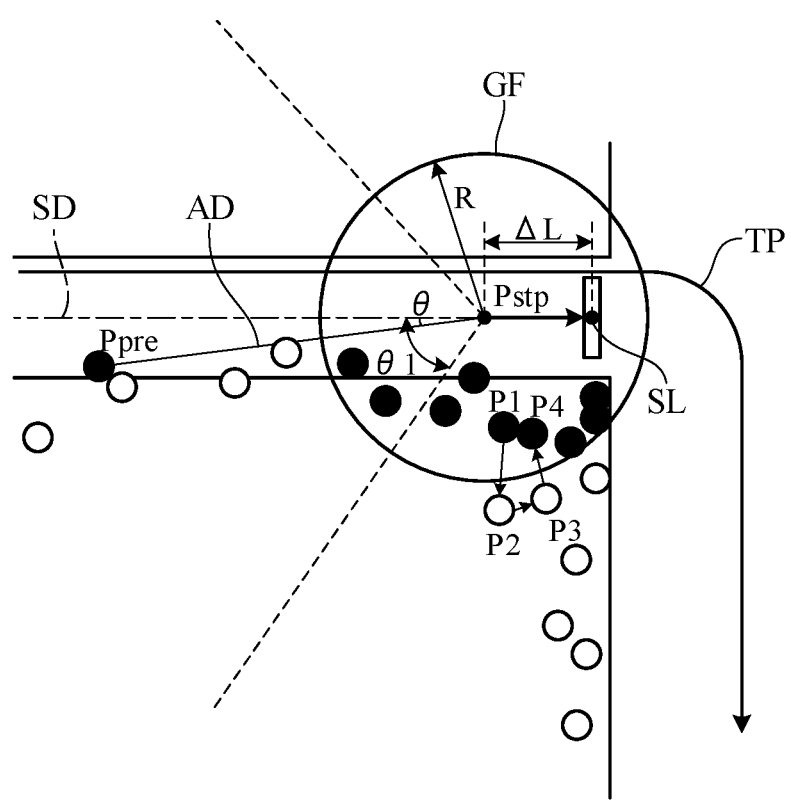
FIG. 4 is a diagram showing stop sign violation determination.

FIG. 4 is a diagram showing a stop sign violation determination and shows, on a map, plots (white circles and black circles) corresponding to location information measured at predetermined time intervals (e.g., intervals of 3 s) of the driver A or B or vehicle 6A or 6B stored in the management information area 215. In particular, FIG. 4 shows an example in which the driver A or B or vehicle 6A or 6B enters a one-way intersection with stop obligation from the left of the figure and turns to the right. A stop determination area GF is set as the inside area of a determination circle centered on a reference point Pstp a predetermined distance ΔL (e.g., about 20 m) before a stop location SL and having a predetermined radius R (e.g., about 40 m). The predetermined distance ΔL and predetermined radius R are set considering the location of the driver terminal 1A or 1B when the vehicle 6A or 6B lawfully stops before the stop location SL and an error in the location measured using a GPS satellite. The stop determination area GF need not be the inside area of a circle and may be set as the inside area of an ellipse, polygon, or the like.

The plots corresponding to location information in FIG. 4 include ones that are not present on the road. This is due to errors in the location measured using a GPS satellite. Location measurement using GPS satellites has difficulty in acquiring highly accurate location information. For this reason, a violation determination is made as follows.

The violation determination unit 206 determines whether the driver A or B or vehicle 6A or 6B has entered the stop determination area GF shown in FIG. 4 and then exited the stop determination area GF, on the basis of location information stored in a management information area 215. A travel trajectory represented by plots based on locations measured using a GPS satellite may not match the actual travel trajectory TP. For this reason, there may be obtained travel trajectories P1 to P4 including plots P2 and P3 shown in FIG. 4 that appear to have temporarily exited the stop determination area GF. In this case, the violation evaluation unit 206 determines that the driver A or B or vehicle 6A or 6B has located within the stop determination area GF for a predetermined time period tcnt (e.g., 30 s) after entering the stop determination area GF and then exited the stop determination area GF. Thus, plots that appear to have temporarily exited the stop determination area GF, such as the plots P2 and P3, also can be handled as data useful to determine a stop sign violation.

If the violation evaluation unit 206 determines that the driver A or B or vehicle 6A or 6B has entered and then exited the stop determination area GF, the entry direction calculation unit 203 calculates the entry direction AD in which the driver A or B or vehicle 6A or 6B has entered the stop determination area GF. The entry direction AD is calculated as the direction (direction vector) AD in which the driver A or B or vehicle 6A or 6B moves from a plot Ppre a predetermined time period tpre (e.g., 10 s) before the time point when it has entered the stop determination area GF, toward the reference point Pstp. Multiple plots Ppre, for example, 5 s, 10 s, 15 s, and the like, before the time point when the driver or vehicle has entered the stop determination area GF may be used. The entry direction AD may be calculated using a plot at the time point when the driver A or B or vehicle 6A or 6B has entered the stop determination area GF and an immediately preceding plot.

The entry direction determination unit 204 determines whether the driver A or B or vehicle 6A or 6B is traveling a road having the stop location SL ahead. In other words, the entry direction determination unit 204 determines whether the entry direction θ formed by the calculated entry direction AD and a reference entry direction SD stored in the management information area 215 is equal to or smaller than a predetermined angle θ1 (e.g., 45 degrees). If the entry direction θ is equal to or smaller than θ1, the entry direction determination unit 204 determines that the driver A or B or vehicle 6A or 6B is traveling a road having the stop location SL ahead and determines whether it has stopped in the stop determination area GF (geo-fence). The reference entry direction SD is set as a direction (direction vector) SD that is parallel with the direction of the road or lane including the stop location SL and in which the driver or vehicle enters the stop determination area GF toward an intersection with stop obligation, on the basis of map information stored in a map information area 214.

If the entry direction determination unit 204 determines that the driver A or B or vehicle 6A or 6B is traveling a road having the stop location SL ahead, the stop state determination unit 205 determines whether the driver A or B or vehicle 6A or 6B has stopped in the stop determination area GF, on the basis of speed information stored in the management information area 215, that is, speed information of the driver A or B or vehicle 6A or 6B acquired from the driver terminal 1A or 1B. Specifically, the stop state determination unit 205 determines whether there is a stop state in which the travel speed V of the driver A or B or vehicle 6A or 6B has fallen below a predetermined speed V1 (e.g., 4 km/h) within the time period from entry into the stop determination area GF to exit therefrom.

If the stop state determination unit 205 determines that the driver A or B has not stopped, the violation determination unit 206 determines that the driver A or B has violated the stop obligation. When the violation determination unit 206 determines that a stop sign violation has been committed, information indicating the location and date and time of the stop sign violation and violation information including the driver ID of the driver A or B that has committed the violation are stored in the management information area 215.

The violation determination unit 206 also determines whether the driver A or B has performed sudden braking, on the basis of information indicating the threshold of acceleration stored in the management information area 215. Specifically, the violation determination unit 206 determines whether the magnitude of negative acceleration during a deceleration is equal to or greater than the threshold of acceleration (e.g., 10 km/h/s) stored in the management information area 215. If the violation determination unit 206 determines that sudden braking has been performed, information indicating the location and date and time of the sudden braking and violation information including the driver ID of driver A or B that has performed the sudden braking are stored in the management information area 215.

The violation determination unit 206 also determines whether the speed of the vehicle 6A or 6B has exceeded the legal speed or regulation speed, on the basis of information indicating the location and speed threshold of the speed control area stored in the management information area 215. That is, the violation determination unit 206 determines whether the speed during travel in the speed control area has exceeded the threshold (e.g., 40 km/h) of the legal speed or regulation speed stored in the management information area 215. If the violation determination unit 206 determines that the legal speed or regulation speed has been exceeded, information indicating the location and date and time of the speed excess and violation information including the driver ID of driver A or B that has performed the speed excess are stored in the management information area 215.

The violation compilation unit 207 compiles the numbers of violations of the group managed by the manager of the distribution center or the individual drivers belonging to the group in accordance with a driving evaluation information output request transmitted from the manager terminal 3. The numbers of violations are compiled on the basis of the violation information stored in the management information area 215.

Figure 5:
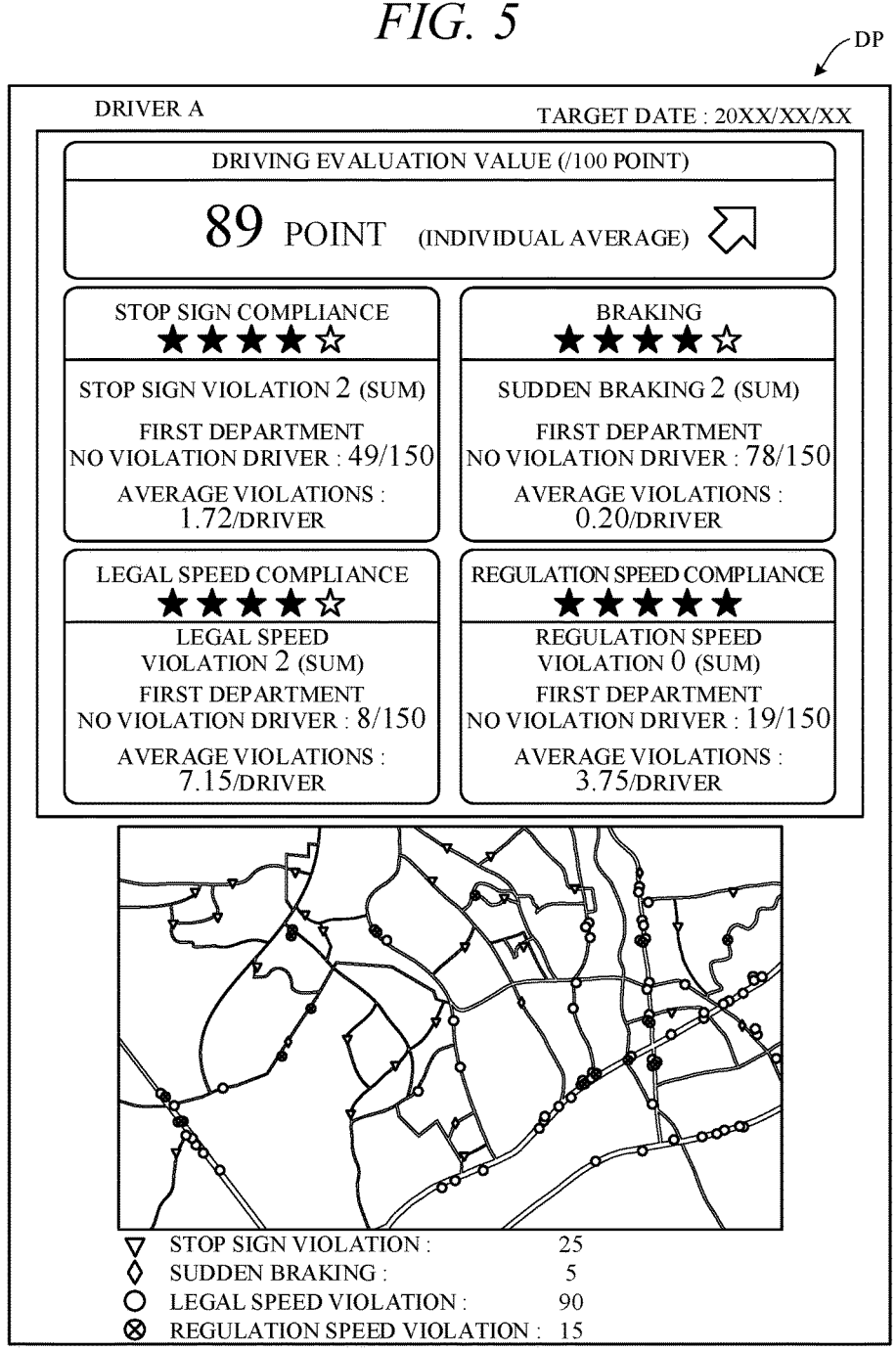
FIG. 5 is a diagram showing driving evaluation information.

The driving evaluation unit 208 generates driving evaluation information in accordance with the driving evaluation information output request transmitted from the manager terminal 3. FIG. 5 is a diagram showing driving evaluation information. The driving evaluation information is generated on the basis of the numbers of violations compiled by the violation compilation unit 207. FIG. 5 show a screen displayed on the manager terminal 3 and is a screen through which the manager of the distribution center requests and views driving evaluation information of the group managed by the manager or the individual drivers belonging to the group (driving evaluation screen DP).

When the manager specifies the compilation target date and target group or driver whose driving evaluation the manager wants to view and inputs a driving evaluation information view request, the manager terminal 3 transmits a driving evaluation information output request to the management server 2. In an example in FIG. 5, the driver A is specified. Upon receipt of such a driving evaluation information output request, the violation compilation unit 207 compiles the number of violations on the compilation target date of the specified target group or driver for each of multiple evaluation items (stop, brake operation, legal speed, and regulation speed). The driving evaluation unit 208 calculates the driving evaluation score, for example, by deduction, in accordance with the numbers of traffic violations compiled by the violation compilation unit 207, as well as ranks the target group or driver and generates driving evaluation information. As shown in FIG. 5, the driving evaluation screen DP also shows an arrow corresponding to a case in which the current driving evaluation score is higher than the preceding one, a case in which it is the same as the preceding one, or a case in which it is lower than the preceding one, a number of stars indicating the level of safe driving, the violation statuses of the other drivers, and the like.

The driving evaluation screen DP also displays a map of the management area of the distribution center indicating the locations of traffic violations. This allows the manager to grasp locations in which a traffic violation is more likely to occur in the management area. The manager is able to use the driving evaluation information to evaluate the group managed by the manager or the individual drivers belonging to the group or give guidance on safe driving thereto.

The information output unit 209 outputs various types of information by transmitting data from the management server 2 to the manager terminal 3 through a communication unit 22. The information outputted from the information output unit 209 includes the driving evaluation information and the like transmitted to the manager terminal 3.

Figure 6:
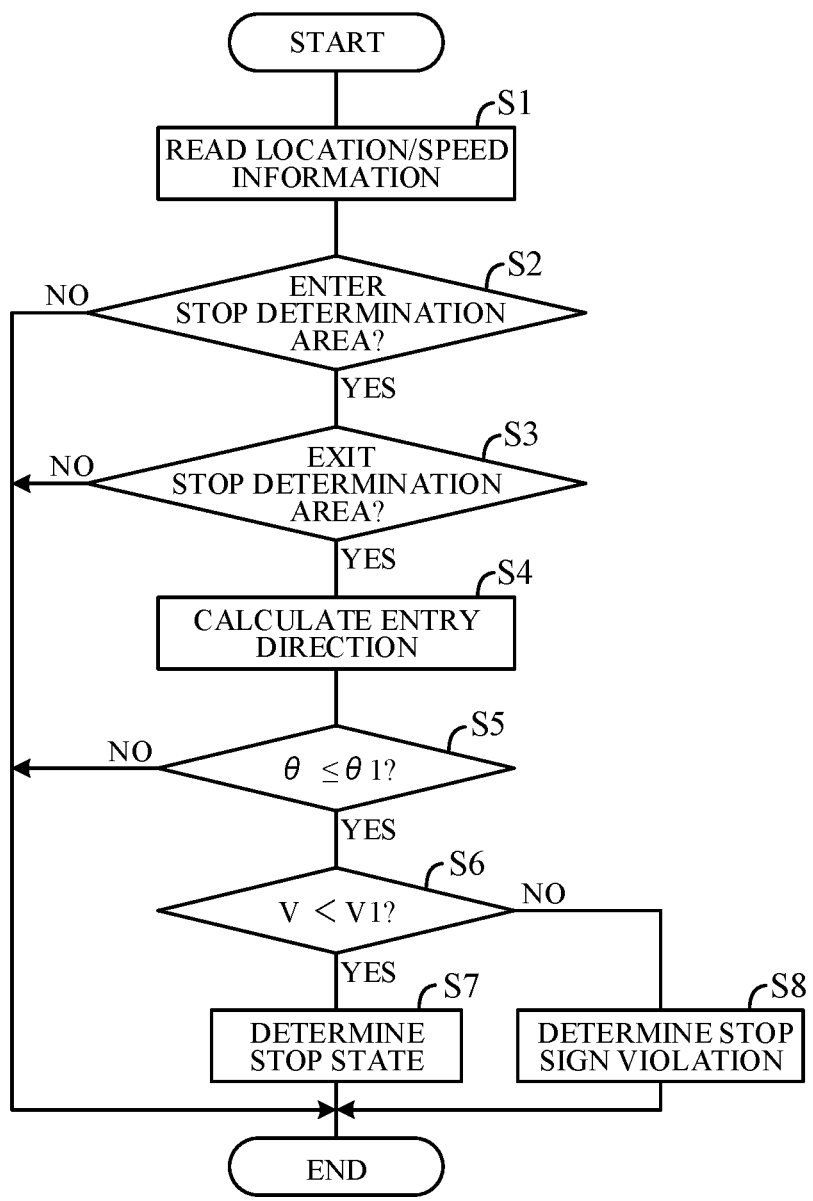
FIG. 6 is a flowchart showing an example of process performed by the management server in FIG. 3.

FIG. 6 is a flowchart showing an example of process performed by the CPU of the management server 2 in accordance with a program stored in advance. The process shown in the flow chart is started, for example, when the management server 2 is powered on and repeated in a predetermined time interval.

First, in step S1, the information acquisition unit 202 acquires the location information and the speed information of the vehicle 6A, 6B and corresponding time information received from the location information notification unit 103 and the speed information notification unit 104 of the driver terminal 1A, 1B through the communication unit 22. Next, in step S2, the violation determination unit 206 determines whether the driver A, B or the vehicle 6A, 6B enters the stop determination area GF based on the location information. When step S2 is affirmative, the process proceeds to step S3, when step S2 is negative, the process ends. In step S3, the violation determination unit 206 determines whether the driver A, B or the vehicle 6A, 6B exits the stop determination area GF based on the location information. When step S3 is affirmative, the process proceeds to step S4, when step S3 is negative, the process ends.

In step S4, the entry direction calculation unit 203 calculates the entry direction AD in which the driver A, B or the vehicle 6A, 6B enters the stop determination area GF. Next, in step S5, the entry direction determination unit 204 determines whether the entry direction $\theta$ formed by the entry direction AD and the reference entry direction SD is equal to or smaller than the predetermined angle $\theta 1$. When step S5 is affirmative, the process proceeds to step S6, when step S5 is negative, the process ends. In step S6, the stop state determination unit 205 determines whether there is the stop state in which the travel speed V of the driver A, B or the vehicle 6A, 6B is below the predetermined speed V1 within the time period from entry into the stop determination area GF to exit therefrom. When step S6 is affirmative, the process proceeds to step S7 and the violation determination unit 206 determines that there is the stop state within the stop determination area GF and the driver A, B complied with the stop obligation. On the other hand, when step S6 is negative, the process proceeds to step S8 and the violation determination unit 206 determines that the driver A, B violated the stop obligation.

As described above, when the entry direction AD to the stop determination area GF with stop obligation is within a predetermined angle from the reference entry direction SD, it is determined whether there is the stop state lower than the predetermined speed V1 within the stop determination area GF (steps S1 to S8), so that the driving status of the driver, such as compliance with or violation of the stop obligation in the area with stop obligation, can be appropriately evaluated. Similarly, a decision area may be set before an intersection with slow down obligation, and the driver's driving status, such as compliance with or violation of the slow down obligation within the determination area, may be appropriately evaluated. Further, since the stop determination area GF is set considering the error of the position measurement using the GPS satellite, even when there is a place where the GPS signal cannot be received or an error becomes large in the vicinity of the stop determination area GF, it is possible to appropriately evaluate the driving status of the driver. Further, since it is possible to evaluate the driving status based only on the location information and the speed information by the GPS signals, processing with high calculation load, such as constant calculation of the angle or calculation of change amount in the angle, is not required.

<Manager Terminal 3>

Next, the manager terminal 3 will be described. The manager terminal 3 is used by the manager of the distribution center to check the numbers of traffic violations of the drivers A and B who drive the vehicles 6A and 6B and pick up and deliver cargoes and to evaluate the driving status of these drivers. The manager terminal 3 is any type of computer, such as a personal computer, tablet terminal, or smartphone, disposed in the base station and transmits and receives information to and from the management server 2 through the network 4.

Figure 7:
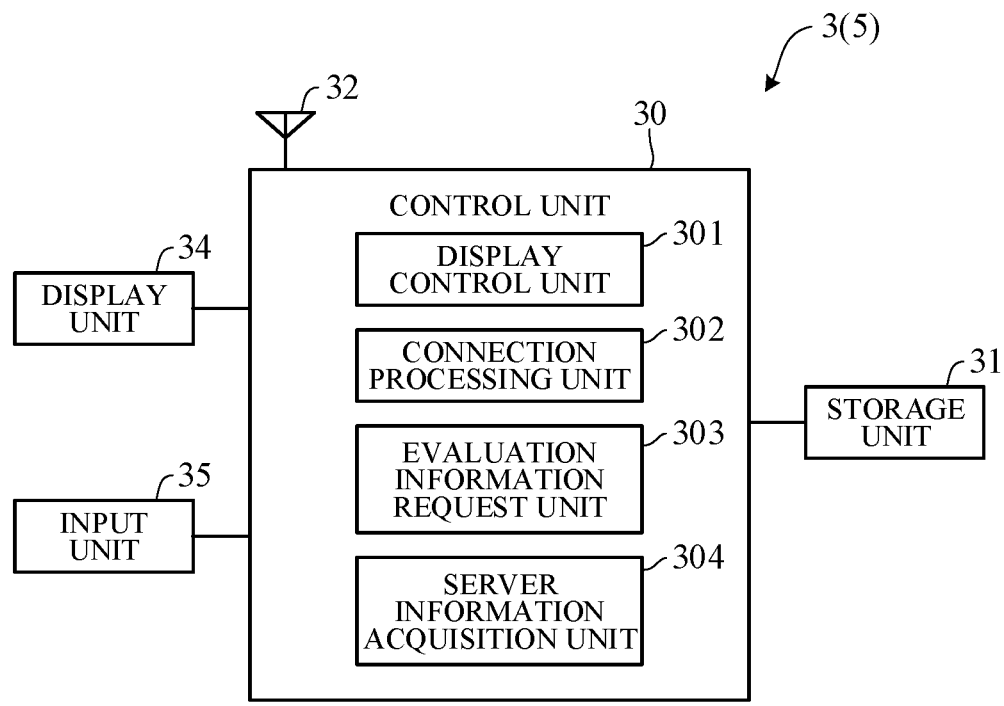
FIG. 7 is a block diagram showing a schematic configuration of a manager terminal in FIG. 1.

FIG. 7 is a block diagram showing a schematic configuration of the manager terminal 3. As shown in FIG. 7, the manager terminal 3 includes a control unit 30, a storage unit 31, a communication unit 32, a display unit 34, and an input unit 35.

The storage unit 31 consists of a semiconductor memory, hard disk, or the like. The storage unit 31 stores various types of information, such as software including an operating system (OS) and application programs.

The communication unit 32 implements a communication protocol capable of wired communication (e.g., the Internet line or the like) or wireless communication, such as 3G, LTE, 4G, or 5G, and is connected to the management server 2 to transmit and receive various types of data to and from the management server 2.

The display unit 34 consists of a display device, such as a liquid crystal display or organic EL panel. Upon receipt of an instruction from the control unit 30, the display unit 34 displays a map, a button icon for operating a touchscreen, or the like. The display unit 34 also displays the driving evaluation information and the like (FIG. 5).

The input unit 35 consists of physical switches, such as a numeric keypad operated by the manager, an input device (not shown), such as a touchscreen, disposed so as to be overlaid on the display surface of the display unit 34, or the like. A command to change the screen display on the display unit 34 is inputted through the input unit 35. Management information for evaluating the driving status of the drivers can be set through the input unit 35.

The control unit 30 includes a processor having a CPU, RAM, ROM, I/O or the like. The control unit 30 has a display control unit 301, a connection processing unit 302, an evaluation information request unit 303, and a server information acquisition unit 304, as a functional configuration.

The display control unit 301 controls the screen display on the display unit 34 by generating an image signal in response to an operation on the input unit 35 and transmitting the image signal to the display unit 34. The screens that the display control unit 301 causes the display unit 34 to display include a login screen for logging in to the management system 100, the driving evaluation screen DP for displaying the driving evaluation information, and the like.

The connection processing unit 302 processes login to the management server 2 using, for example, an identification number for identifying the manager or person in charge of the base station (base station manager ID) and a password.

The evaluation information request unit 303 transmits a driving evaluation information output request to the management server 2 in accordance with an operation on the input unit 35 by the manager.

The server information acquisition unit 304 acquires driving evaluation information or the like transmitted from the management server 2 (information output unit 209). Thus, for example, the driving evaluation information is displayed on the driving evaluation screen DP of FIG. 6.

[Operation of Management System 100]

Next, an example of the operation of the management system 100 will be described. For example, when departing from the distribution center, that is, when starting work, the driver A who drives the vehicle 6A inputs his or her login ID and a password on the login screen displayed on the display unit 14 of the driver terminal 1A through the input unit 15. Thus, the management server 2 processes connection from the driver terminal 1A. Subsequently, the driver terminal 1A communicates with the management server 2 at predetermined time intervals (e.g., at intervals of 3 s), for example, transmits location information of the driver A or vehicle 6A to the management server 2. The communication between the driver terminal 1A and management server 2 continues until the driver terminal 1A logs out.

If the driver A commits a traffic violation, such as a stop sign violation, sudden braking, or speed excess, during the communication between the driver terminal 1A and management server 2, the management server 2 determines that a traffic violation has occurred and manages information indicating the location and date and time of the traffic violation and the driver ID of the driver A. Only when the direction AD in which the driver A enters the stop determination area GF is an entry direction with stop obligation, whether a stop sign violation has been committed is determined on the basis of whether the driver A has stopped in the stop determination area GF even once. Thus, the driving status of the driver A, such as compliance or violation of the stop obligation in an area requiring a stop, can be properly evaluated.

On the other hand, the manager of the distribution center to which the driver A belongs inputs the center manager ID and a password on the login screen displayed on a display unit 34 of the manager terminal 3 through an input unit 35. Thus, the management server 2 processes connection from the manager terminal 3. The driving evaluation screen DP showing driving evaluation information of the group managed by the manager or the driver A belonging to the group is displayed on the display unit 34 of the manager terminal 3 in accordance with an operation by the manager (FIG. 5). The manager is able to use the driving evaluation information to evaluate the group managed by the manager or the individual drivers belonging to the group or give guidance on safe driving thereto.

The present embodiment can achieve advantages and effects such as the following:

(1) The driving evaluation apparatus 5 is configured to evaluate the driving status of the driver A, B driving the vehicle 6A, 6B in the stop determination area GF with stop obligation. The driving evaluation apparatus 5 includes: the information acquisition unit 202 configured to acquire the location information and the travel speed information of the vehicle 6A, 6B based on GPS signals received by the GPS sensor 13a provided on the driver terminal 1A, 1B carried by the driver A, B; the entry direction calculation unit 203 configured to calculate the entry direction AD in which the vehicle 6A, 6B enters the stop determination area GF with stop obligation based on the location information of the vehicle 6A, 6B acquired by the information acquisition unit 202; the entry direction determination unit 204 configured to determine whether the angle θ formed by the entry direction AD calculated by the entry direction calculation unit 203 and the predetermined reference entry direction SD of the vehicle 6A, 6B into the stop determination area GF is equal to or smaller than the predetermined angle θ1; the state determination unit 205 configured to determine whether there is the stop state in which the travel speed V of the vehicle 6A, 6B is lower than the predetermined travel speed V1 within a time period from a time point when the vehicle 6A, 6B enters the stop determination area GF to a time point when the vehicle 6A, 6B exits the stop determination area GF based on the location information and the speed information of the vehicle 6A, 6B acquired by the information acquisition unit 202, when it is determined by the entry direction determination unit 204 that the angle θ formed by the entry direction AD and the reference entry direction SD is equal to or smaller than the predetermined angle θ1; and the driving evaluation unit 208 configured to evaluate the driving status of the driver A, B in the stop determination area GF based on the determination result of the stop state determination unit 205 (FIG. 3).

With this configuration, it becomes possible to appropriately evaluate the driving status of the driver A, B, such as compliance with or violation of the stop obligation in the area with stop obligation. Further, since it is possible to evaluate the driving status of the driver A, B based only on the location information and the speed information by the GPS signals, processing with high calculation load, such as constant calculation of the angle or calculation of change amount in the angle, is not required.

(2) The stop determination area GF is an area inside the determination circle centered on the reference point Pstp the predetermined distance ΔL before the stop location SL with stop obligation and having the predetermined radius R. With this, by setting the stop determination area GF in consideration of errors in position measurement using GPS satellites, even when there is a place where GPS signals cannot be received or where errors become large in the vicinity of the stop determination area GF, it becomes possible to appropriately evaluate the driving status of the driver.

(3) The entry direction calculation unit 203 is configured to calculate a direction starting from the plot Ppre corresponding to the location information of the vehicle 6A, 6B the predetermined time period tpre before a time point when the vehicle 6A, 6B enters the stop determination area GF inside the determination circle and directed to the reference point Pstp as the entry direction AD based on the location information of the vehicle 6A, 6B acquired by the information acquisition unit 202. With this, since compliance with or violation of the stop obligation is determined only when there is the stop obligation, it becomes possible to appropriately evaluate the driving status of driver A, B.

(4) The driving evaluation apparatus 5 includes: the violation determination unit 206 configured to determine whether the vehicle 6A, 6B is in the stop determination area GF (FIG. 3). The stop state determination unit 205 is configured to determine whether there is the stop state in which the travel speed V of the vehicle 6A, 6B is lower than the predetermined travel speed V1 when it is determined by the violation determination unit 206 that the vehicle 6A, 6B is in the stop determination area GF. With this, it becomes possible to evaluate the driving status of the driver located in the stop determination area GF with the stop obligation.

(5) The violation determination unit 206 determines that the vehicle 6A, 6B exits the stop determination area GF the predetermined time period tcnt after the vehicle 6A, 6B enters the stop determination area GF. With this, plots that appear to have temporarily exited the stop determination area GF due to errors in position measurement using GPS satellites can also be used as valid data for the determination of the stop sign violation.

Figure 8:
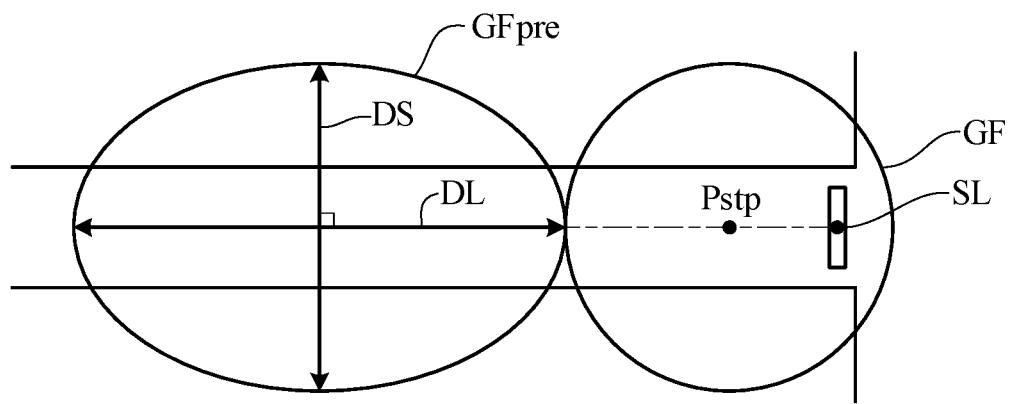
FIG. 8 is a diagram showing a modification of stop sign violation determination in FIG. 4.
Figure 9:
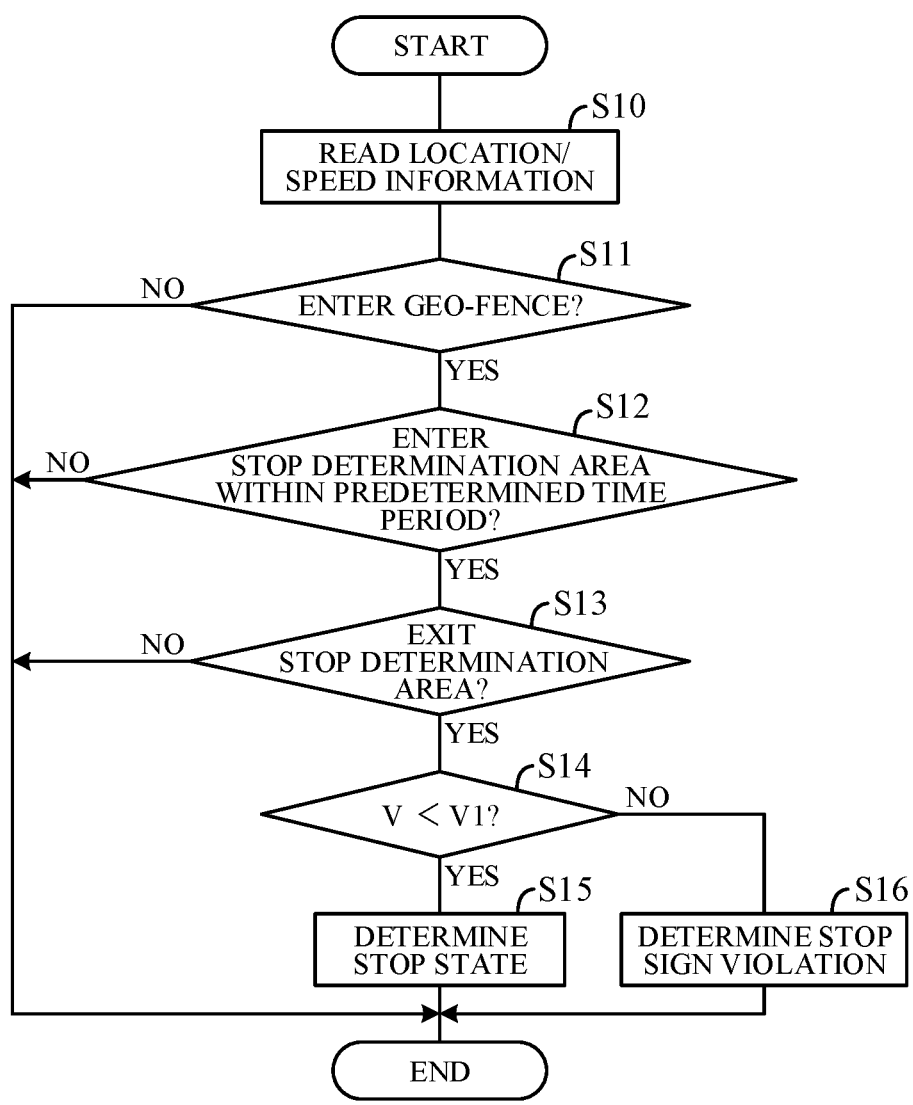
FIG. 9 is a flowchart corresponding to the modification in FIG. 8.

The above embodiment can be modified to various forms. Hereinafter, modified examples will be described. In the above embodiment, although the stop obligation is determined and the stop determination is made when the entry direction AD into the stop determination area GF is within the predetermined angle from the reference entry direction SD (FIG. 4, FIG. 6), a stop determination is not limited to such a determination. FIG. 8 is a diagram showing a modification of the stop sign violation determination in FIG. 4, and FIG. 9 is a flowchart showing process performed by the CPU of the management server 2, corresponding to the modification in FIG. 8. The process shown in the flow chart is started, for example, when the management server 2 is powered on and repeated in a predetermined time interval.

As exemplified in FIG. 8, in the area in front of the stop determination area GF, a pre-geofence GFpre for determining the entry direction into the stop determination area GF when the vehicle should stop is preset by the manager through the manager terminal 3. The pre-geofence GFpre has, for example, a major diameter DL on a straight line passing through the stop location SL and the center of the stop determination area GF (reference point) Pstp, and is set as an area inside an ellipse in contact with the stop determination area GF.

The major diameter DL of the pre-geofence GFpre is set to be larger than the diameter of the determination circle of the stop determination area GF considering that the travel speed V of the driver A, B or the vehicle 6A, 6B increases as the distance from the stop location SL increases. The minor axis DS of the pre-geofence GFpre is set to be approximately the same as the diameter of the determination circle.

As shown in FIG. 9, in step S10, the information acquisition unit 202 acquires the location information and the speed information of the driver A, B or the vehicle 6A, 6B and the corresponding time information, then, in step S11, the violation determination unit 206 determines whether the driver A, B or the vehicle 6A, 6B enters the pre-geofence GFpre based on the location information. When step S11 is affirmative, in step S12, the violation determination unit 206 determines whether the driver A, B or the vehicle 6A, 6B enters the stop determination area GF within a predetermined time period (for example, 20 seconds) after entering the pre-geofence GFpre based on the location information. When step S12 is affirmative, specifically, when the stop obligation is determined, in step S13, the violation determination unit 206 determines whether the driver A, B or the vehicle 6A, 6B exits the stop determination area GF based on the location information.

When step S13 is affirmative, in step S14, the stop state determination unit 205 determines whether there is the stop state within the stop determination area GF. When step S14 is affirmative, in step S15, the violation determination unit 206 determines that the driver A, B complied with the stop obligation. On the other hand, when step S14 is negative, specifically, when it is determined that there is no stop state within the stop determination area GF, in S16, the violation determination unit 206 determines that the driver A, B violated the stop obligation.

In the above embodiment, although an example has been described in which the driving evaluation apparatus 5 evaluates the level of safe driving of the driver who drives the vehicle and performs the pickup and delivery work, a driving evaluation apparatus may be any configuration as long as it evaluates level of safe driving of worker in charge of driving vehicle during work hours.

In the above embodiment, although the driving status of the driver A, B in the stop determination area GF with stop obligation, configuration of a driving evaluation apparatus for evaluating driver's driving status in an area with stop obligation or deceleration obligation is not limited thereto. For example, driver's driving status in an area with slow down obligation can be evaluated.

In the above embodiment, although the GPS sensor 13a is mounted on the driver terminal 1A, 1B carried by the driver A, B, a GPS receiver may be any configuration as long as it is provided on mobile terminal carried by the driver or the mobile body.

In the above embodiment, although the information acquisition unit 202 acquires the location information and the speed information calculated on the side of the driver terminal 1A, 1B, configuration of an information acquisition unit that acquires location information and speed information of the mobile body is not limited to this. For example, based on the GPS signals received on the side of the driver terminal 1A, 1B, location or speed may be calculated by the management server 2.

In the above embodiment, although the entry direction calculation unit 203 calculates the entry direction AD as the direction vector AD directed to the reference point Pstp starting from the plot Ppre the predetermined time period tpre before entering the stop determination area GF, an entry direction calculation unit may be any configuration as long as it calculates entry direction at the time of entering the determination area.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 1A, 1B driver terminal, 2 management server, 3 manager terminal, 4 network, 5 driving evaluation apparatus, 6A, 6B vehicle, 10 control unit, 11 storage unit, 12 wireless unit, 13 sensor unit, 13a GPS sensor, 13b gyro sensor, 14 display unit, input unit, 20 control unit, 21 storage unit, 22 communication unit, 24 display unit, 25 input unit, 30 control unit, 31 storage unit, 32 communication unit, 34 display unit, 35 input unit, 100 management system, 101 display control unit, 102 connection processing unit, 103 location information notification unit, 104 speed information notification unit, 201 connection processing unit, 202 information acquisition unit, 203 entry direction calculation unit, 204 entry direction determination unit, 205 stop state determination unit, 206 violation determination unit, 207 violation compilation unit, 208 driving evaluation unit, 209 information output unit, 211 driver information area, 212 vehicle information area, 213 pickup/delivery destination information area, 214 map information area, 215 management information area, 301 display control unit, 302 connection processing unit, 303 evaluation information request unit, 304 server information acquisition unit, DP driving evaluation screen.

The invention claimed is:

1. A driving evaluation apparatus configured to evaluate a driving status of a driver driving a mobile body in an area with a stop obligation or deceleration obligation, comprising:
a microprocessor and a memory coupled to the microprocessor, wherein
the microprocessor is configured to perform:
acquiring location information and travel speed information of the mobile body based on GPS signals received by a GPS receiver provided on a mobile terminal carried by the driver or provided on the mobile body;
calculating an entry direction in which the mobile body enters a determination area including a predetermined location requiring stop or deceleration of the mobile body based on the location information of the mobile body acquired;
determining whether an angle formed by the entry direction calculated and a predetermined reference entry direction of the mobile body on a route in the determination area is equal to or smaller than a predetermined angle;
conducting a state determination as to whether there is a stop state or a deceleration state in which a travel speed of the mobile body is equal to or lower than a predetermined travel speed within a time period from a time point when the mobile body enters the determination area to a time point when the mobile body exits the determination area based on the location information and the speed information of the mobile body acquired, when it is determined that the angle formed by the entry direction and the reference entry direction is equal to or smaller than the predetermined angle; and
evaluating the driving status of the driver in the determination area based on a determination result of the state determination, wherein
the determination area is an area inside a determination circle centered on a reference point a predetermined distance before the predetermined location and having a predetermined radius, wherein
the reference entry direction is a direction set parallel to a road or a lane including the predetermined location, wherein
the angle formed by the entry direction and the reference entry direction is an angle formed by:
a straight line along the reference entry direction and passing through the reference point; and
a straight line connecting a plot representing a location of the mobile body before entering inside the determination circle and the reference point.

2. The driving evaluation apparatus according to claim 1, wherein the microprocessor is configured to perform:
the calculating including calculating a direction starting from a position of the mobile body a predetermined time period before a time point when the mobile body enters the area inside the determination circle and directed to the reference point as the entry direction based on the location information of the mobile body acquired.

3. The driving evaluation apparatus according to claim 1, wherein
the microprocessor is configured to perform:
conducting a position determination as to whether the mobile body is in the determination area, wherein
the microprocessor is configured to perform:
the state determination conducting including determining whether there is the stop state or the deceleration state in which the travel speed of the mobile body is equal to or lower than the predetermined travel speed when it is determined that the mobile body is in the determination area.

4. The driving evaluation apparatus according to claim 3, wherein
the microprocessor is configured to perform:
the position determination conducting including determining that the mobile body exits the determination area a predetermined time period after the mobile body enters the determination area.

5. The driving evaluation apparatus according to claim 1, wherein
the predetermined angle is 45 degrees.

* * * * *